United States Patent [19]
Florian et al.

[11] 3,890,606
[45] June 17, 1975

[54] SEISMOMETER

[75] Inventors: Eugene F. Florian; Samuel E. Haggard; Travis E. Riley, all of Houston, Tex.

[73] Assignee: Mark Products, Inc., Houston, Tex.

[22] Filed: May 29, 1973

[21] Appl. No.: 364,970

[52] U.S. Cl. ................................ 340/17; 340/15
[51] Int. Cl. ............................................. G01v 1/16
[58] Field of Search .......... 340/7, 11, 14, 17, 17 SP, 340/8 LF

[56] References Cited
UNITED STATES PATENTS

| | | | |
|---|---|---|---|
| 2,570,672 | 10/1951 | Hathaway | 340/14 |
| 2,748,370 | 5/1956 | Baltosser | 340/17 SP |
| 2,776,560 | 1/1957 | Erath et al. | 340/17 SP |
| 2,961,639 | 11/1960 | Atanasoff | 340/14 |
| 3,018,467 | 1/1962 | Harris | 340/14 |
| 3,344,397 | 9/1967 | Elliott et al. | 340/17 SP |
| 3,577,184 | 5/1971 | McNeel | 340/17 SP |
| 3,718,900 | 2/1973 | Holmes, Jr. | 340/17 |

Primary Examiner—Maynard R. Wilbur
Assistant Examiner—T. M. Blum
Attorney, Agent, or Firm—Bargfrede and Thompson

[57] ABSTRACT

A seismometer is disclosed having a coil-mass assembly supported for movement along a selected axis relative to a magnet assembly when the seismometer is moved, as by vibrations of the earth. The coil-mass assembly is supported for such movement by spring spiders having the desired spring rate to produce the frequency of response desired. In addition, two spring spiders are provided between the coil-mass assembly and magnet assembly that exert substantially equal but opposite forces in the direction of movement of the coil-mass assembly along the selected axis. These spring spiders are designed to substantially reduce the movement of the coil-mass assembly laterally of the selected axis while exerting little or no influence on the frequency response of the seismometer.

5 Claims, 3 Drawing Figures

PATENTED JUN 17 1975

3,890,606

SEISMOMETER

This invention relates to seismometers generally, and in particular to seismometers having one element supported by springs for movement relative to another element thereof.

Seismometers are motion sensing devices. Commonly, they are used to sense vibrations or tremors of the earth. Seismometers include two elements that are mounted to move relative to each other. One element is connected to the source of movement, such as the ground, and moves with it, whereas the other element will tend to resist such movement due to its inertia. The amount of relative movement, then, is a measure of the strength of the earth tremor.

Normally, a seismometer is positioned for the selected axis of movement of the inertial element to be either vertical or horizontal with respect to the earth to measure either vertical or horizontal movement of the earth. An earth tremor, however, will impose both vertical and horizontal forces on the seismometer and so, in either position, the inertial element will be urged to move both along the selected axis and laterally thereof. Lateral movement produces spurious signals and therefore the inertial element must be constrained against such movement to the extent possible without affecting the frequency response of the instrument.

Usually, one of the elements includes a coil and the other element includes a magnet providing a field in which the coil is located. The movement of one relative to the other induces a current in the coil and provides a signal proportional to the velocity of the movement. To be sensitive to very slight earth movements, very little, if any, frictional resistance to such relative movement of the elements can be tolerated.

To avoid such friction, the inertial element is commonly supported on springs. The spring rate determines the frequency response of the seismometer. Generally, low spring rates are required to detect low frequency vibrations, such as 1 to 2 cycles per second. As the spring rates go down, so does the ability of the springs to resist lateral movement of the inertial element and the spurious signals tend to increase.

Therefore, it is an object of this invention to provide a seismometer with springs that provide additional resistance to lateral movement of the inertial element without affecting substantially the frequency response of the seismometer.

It is another object of this invention to provide a seismometer in which the inertial element of the seismometer is supported by springs of the desired spring rate to provide the seismometer with the desired frequency response, and in addition is supported by springs that give the desired lateral support to the suspended element while exerting little or no resultant force resisting the movement of the suspended element along the selected axis of movement.

It is a further object of this invention to provide a seismometer with springs that provide the desired lateral support to the inertial element and that exert substantially equal and opposite forces on the element in the direction of the selected axis of travel thereby having no practical affect on the frequency response of the seismometer.

These and other objects, advantages and features of this invention will be apparent to those skilled in the art from a consideration of this specification, including the attached drawings and appended claims.

Figure 1:
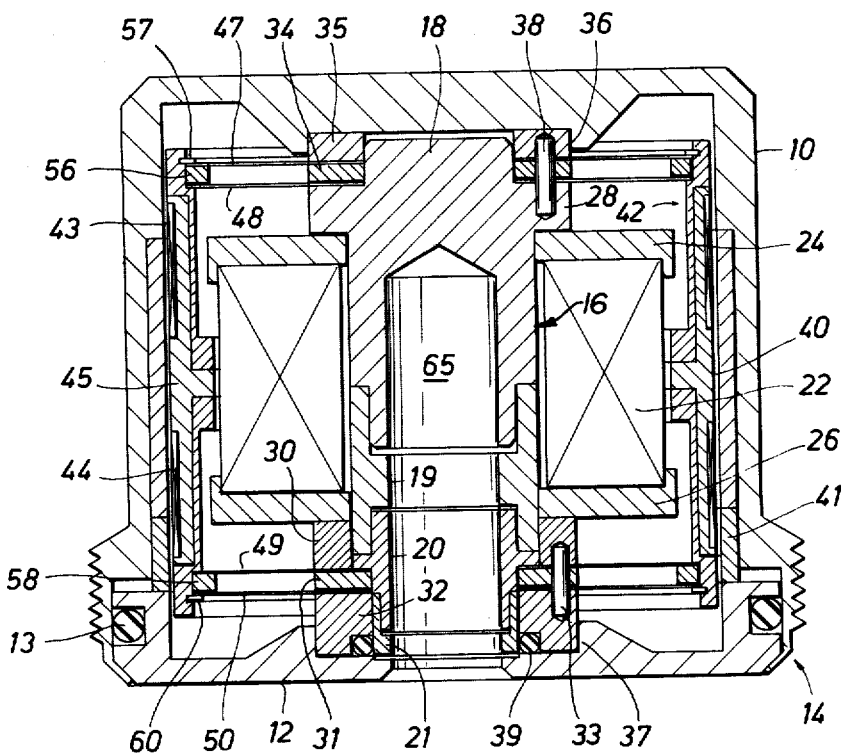
FIG. 1 is a vertical cross-sectional view through a seismometer embodying this invention.

This invention has utility in any transducer that is motion sensitive, such as a seismometer, wherein friction-free relative movement of two members or elements provides a signal. In the drawings, a seismometer of the electro-magnetic type is shown. When used to measure earth vibrations or tremors, one element is in engagement with and moved by the earth, while the second is supported by springs and lags behind the movement of the first due to its inertia. One element provides a magnetic field. The other element carries a coil that cuts the flux of the magnetic field due to the relative movement. The current induced in the coil is proportional to the movement.

The seismometer includes an outer case made up of cupshaped cylindrical member 10 and cap 12. O-ring 13 provides a seal between the outside surface of the cap and case member 10. The lower edge of member 10 is bent over the cap, as shown at 14, to hold the two case members assembled. Cylindrical post assembly 16 is centrally located in the case and extends between the end wall of case member 10 and cap 12. It includes upper cylindrical member 18, middle member 19, lower tubular member, 20, and spacer 21. The center post supports magnet 22, which is clamped between inner pole pieces 24 and 26, which, in turn, are clamped between flange 28 on post member 18 and annular spacers 30, 31, and 32. Pin 33 holds spacers 30, 31, and 32 in assembled position.

Annular spacers 34 and 35 are located between the upper side of flange 28 and the end wall of case member 10 to clamp the center post between the end wall of the case member 10 and cap 12. Circular cavity 36 in the upper end of the case receives spacer 35 and anchors the upper end of the post from lateral movement. A similar circular cavity 37 is provided in the cap to receive spacer 32 to hold the bottom of the center post against such lateral movement. Pin 38 connects spacers 34 and 35 to flange 28 on the upper member of the center post assembly. O-ring 39 provides a seal between cap 12 and the center post assembly.

To complete the magnet assembly, annular outer pole piece 40 is located in a recess on the inside wall of case member 10. It is spaced from inner pole pieces 24 and 26, as shown. It is held in position in the recess by annular spacer 41 and cap 12.

Located between the pole pieces is annular coil-mass assembly 42. It includes coils 43 and 44 mounted on the outside surface of cylindrical coil support assembly 45. The coil-mass assembly is supported for relative movement along a selected axis which, in this case, is the longitudinal axis of center post assembly 18 and the longitudinal axis of case 10. In the embodiment shown, spring spiders 47 and 48 extend between the upper end of the center post and the coil-mass assembly, and spring spiders 49 and 50 extend between the center post assembly and the lower end of the coil-mass assembly to support the coil-mass assembly for such movement.

Figure 2:
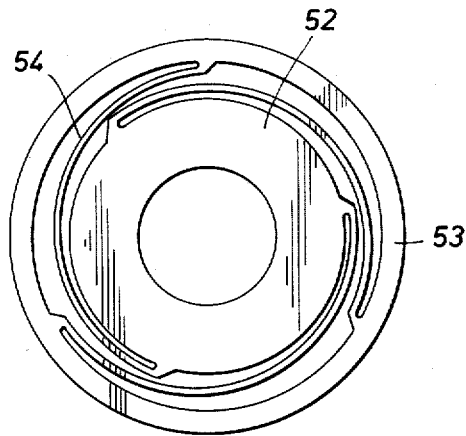
FIG. 2 is a plan view of one of the spring spiders employed to suspend one element of the seismometer for movement relative to the other element thereof.

In FIG. 2, a typical spring spider is shown. It includes inner annular portion 52 and outer annular portion 53. The inner and outer portions are connected together by curved arms 54, three of which are shown in the embodiment of FIG. 2. To connect the spring spiders to support the coil-mass assembly, inner annular portion 52 is clamped to the center post and the outer annular portion is clamped to the coil-mass assembly. For example, spring spider 47 has its inner annular portion 47a clamped between spacers 34 and 35. Its outer annular portion 47b is clamped between spacer 56 and snap ring 57. Spring spider 48 is mounted with its inner annular portion 48a clamped between spacer 34 and flange 28 on the central post assembly. Its outer annular portion is clamped between spacer 56 and the upwardly facing annular shoulder on the coil mass assembly. In the same manner, spring spider 49 is clamped on the inside between spacers 30 and 31 and on the outside between spacer 58 and the shoulder formed on the lower end of the coil-mass assembly. Spring spider 50, in turn, is clamped between spacers 31 and 32 and between spacer 58 and snap ring 60. Thus assembled, the coil-mass assembly, due to its inertia, will move along a line parallel to the longitudinal axis of the center post and relative to magnet 22 when the seismometer is subjected to movement in the direction of this preselected axis.

Figure 3:
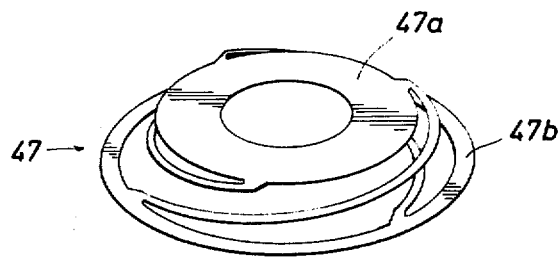
FIG. 3 is an isometric view of the spring spiders employed in the seismometer of FIG. 1 with the spring spiders shown in their preformed state prior to assembly in the seismometer.
Figure 3:
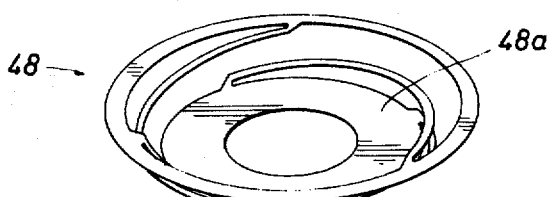
Figure 3:
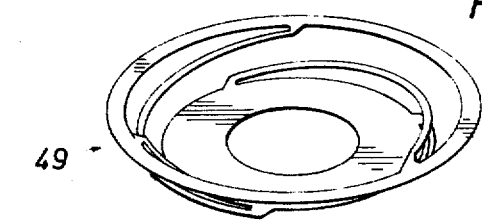
Figure 3:
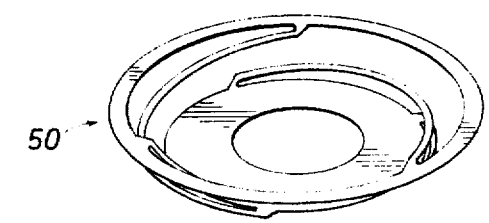

The amount of relative movement for any given force imposed on the seismometer will depend upon the spring rate of the spring spiders that support the coil-mass for such movement. In this embodiment, spring spiders 48 and 49 are designed to provide the spring rate for the desired frequency of the seismometer. They may be preformed before assembly, as shown in FIG. 3. Normally, the spring spiders are preformed so that when assembled and the weight of the coil-mass assembly is imposed on the outer annular portions of the springs, the weight will bring the springs back so that the outer and inner portions lie substantially in the same plane, as indicated in the assembly drawing of FIG. 1.

In accordance with this invention, second spring means are provided for connecting between the elements that move relative to each other for limiting the movement of the moving element laterally of the selected axis of relative movement while exerting substantially equal and opposite forces resisting the movement of the first element along the selected axis of movement. In the embodiment shown, such means comprise spring spiders 47 and 50. As shown in FIG. 3, these two spring spiders are preformed in the opposite direction so that when assembled, as shown in FIG. 1, they will exert substantially equal and opposite forces urging the coil-mass to move along the selected axis of movement for the seismometer. The substantially equal and opposite forces tend to cancel out and, therefore, these springs have little or no effect on the frequency response of the seismometer. They can, however, be designed to provide substantial lateral support to the coil-mass assembly.

In other words, since as assembled and designed spring spiders 47 and 50 substantially cancel each other out as far as effecting movement along the selected axis, they can be designed to provide good lateral support without regard to their effect on the frequency response of the seismometer. As shown, the springs appear to be alike. Springs 47 and 50, however, could be made of thicker material to better resist lateral movement or provided with wider arms. Also, instead of using two, multiples of two could be used as long as the resultant force imposed on the movable element in the direction of its desired movement is substantially zero.

Movement of the coil through the magnetic field of the magnet, of course, induces an electrical signal in the coils. In the embodiment shown, coil 43 is electrically connected to spring spiders 47 and 48. The spiders are made of electrically conductive material, such as beryllium copper, and they carry the signal to upper post member 18, which is also electrically conductive. Preferably, spacer 34 is conductive and spacer 35 is not. On the lower end of the coil-mass assembly, coil 44 is electrically connected to spring spiders 49 and 50. They, in turn, conduct the electrical signal from the coils to spacer 31 which is electrically connected to lower post member 20. Post member 19 is nonconductive, as is spacer 21. The electrical signal produced by the coils is connected to a conduit by a plug (not shown) that is positioned in opening 65 in the center post and makes electrical contact with upper post member 18 and lower post member 20.

From the foregoing, it will be seen that this invention is one well adapted to attain all of the ends and object hereinabove set forth, together with other advantages which are obvious and which are inherent to the apparatus.

It will be understood that certain features and subcombinations are of utility and may be employed without reference to other features and subcombinations. This is contemplated by and is within the scope of the claims.

As many possible embodiments may be made of the apparatus of this invention without departing from the scope thereof, it is to be understood that all matter herein set forth or shown in the accompanying drawings is to be interpreted as illustrative and not in a limiting sense.

The invention having been described, what is claimed is:

1. A seismometer for sensing motion along a selected axis comprising first and second elements that provide an output signal when moved relative to each other along said selected axis and resilient means to support one of said elements for said movement relative to the other including first spring means providing a resilient force to support the second element in a given position relative to the first when the elements are at rest and to allow relative movement of the elements due to the inertia of the second when the first is moved, and second spring means connected between the elements for limiting the movement of said first element laterally of the selected axis of relative movement while exerting substantially equal and opposite forces resisting the movement of the first element along said selected axis.

2. The seismometer of claim 1 in which the second spring means includes two spring spiders connected between the elements to resist relative lateral movement while exerting substantially equal opposing forces resisting movement of said element along said selected axis.

3. The seismometer of claim 2 in which the first element includes a magnet and the second element includes a coil in which an electrical signal is generated when the coil is moved through the field of the magnet.

4. A seismometer comprising first and second relatively movable elements providing an output signal due to their relative movement, means yieldingly supporting one of said elements for movement along a given axis including at least one spring spider for supporting the element for said movement and two spring spiders connected between the two elements providing resistance to movement and exerting substantially opposite and equal forces urging the element to move along said axis of movement to increase the resistance offered by said spring spiders to relative movement of said elements in a direction laterally of the axis of movement.

5. A seismometer for sensing motion along a selected axis comprising first and second elements that provide an output signal when moved relative to each other, a spring member connected between the members to support one of said elements relative to the other and to resist the movement of said one element relative to the other along said selected axis with a preselected resilient force to give the seismometer the desired frequency response and two spring members connected between the elements to resist movement of said element relative to the other element laterally of said selected axis while exerting substantially equal and opposite forces resisting such relative movement along said selected axis so as to have a negligible effect on the frequency response of the seismometer along said selected axis.

* * * * *